(12) United States Patent
Grace

(10) Patent No.: US 6,701,965 B1
(45) Date of Patent: Mar. 9, 2004

(54) WASTE PIPE REPAIR INSERT

(76) Inventor: Joseph Grace, 26 Summit Dr., Mahopac, NY (US) 10541

( * ) Notice: Subject to any disclaimer, the term of this patent is extended or adjusted under 35 U.S.C. 154(b) by 236 days.

(21) Appl. No.: 09/917,532

(22) Filed: Oct. 31, 2001

(51) Int. Cl.[7] ................................................ F16L 55/16
(52) U.S. Cl. ........................ 138/98; 138/121; 138/112; 138/114; 4/679
(58) Field of Search ............................ 138/97, 98, 112, 138/114, 121, 122, 133; 4/650, 679

(56) References Cited

U.S. PATENT DOCUMENTS

| | | | | |
|---|---|---|---|---|
| 3,070,130 A | * | 12/1962 | Risley | 138/97 |
| 3,968,552 A | * | 7/1976 | Hunter | 138/98 |
| 4,067,362 A | * | 1/1978 | Jackman | 138/121 |
| 4,754,781 A | * | 7/1988 | Jan de Putter | 138/98 |
| 4,953,235 A | * | 9/1990 | Cornwall | 4/679 |
| 5,127,441 A | * | 7/1992 | Rains | 138/114 |
| 5,185,890 A | * | 2/1993 | Dismore et al. | 4/252.5 |
| 5,673,469 A | * | 10/1997 | Dickson et al. | 138/97 |
| 5,752,786 A | * | 5/1998 | Huikari | 138/97 |
| 6,126,206 A | * | 10/2000 | Topf, Jr. | 138/97 |
| 6,337,114 B1 | * | 1/2002 | Wood et al. | 138/98 |

* cited by examiner

*Primary Examiner*—James Hook
(74) *Attorney, Agent, or Firm*—Joseph P. Kincart

(57) ABSTRACT

A method and device is provided for repairing a plumbing waste pipe without having to remove a failed portion of the waste pipe. A flexible sleeve with a flange is fit inside the failed waste pipe such that the outer circumference of the sleeve is in radial contact with the inner circumference of the failed pipe and the body of the sleeve extends through the failed waste pipe beyond the point of failure. The flange can be fastened between the plumbing fixture and the failed waste pipe to securely maintain the flexible sleeve within the failed pipe. Water and waste material will enter the sleeve through the flange and pass through the interior of the sleeve beyond the point of failure in the waste pipe. The water and waste can then be discharged into the waste pipe to be carried along its normal route.

11 Claims, 3 Drawing Sheets

WASTE PIPE REPAIR INSERT

BACKGROUND

The present invention relates to plumbing waste pipes and in particular to a waste or other drain pipe incorporating a lead trap or other"S" or"U" shaped piping configuration.

Connection of waste pipes from popular plumbing units, such as toilets and sinks, to a sewer line would not be acceptable in most applications without some device in place to prevent noxious sewer gas, vermin or other undesirable effects from entering a building through the piping. One device commonly used to contain undesirable effects within the piping is a water trap set near the outlet of each unit. Typically, a water trap is constructed from an"S" or"U" shaped portion of waste pipe containing a sufficient amount of water to completely fill a small volume of the piping and thereby seal off the passage of gases or vermin from a sewer line into a building through the waste pipe.

Plumbing waste pipe has traditionally been fashioned out of cast iron or galvanized steel and more recently out of polyvinyl chloride or other water resistant material. In residential and light commercial buildings, the waste pipe is typically located directly alongside or in close proximity to floor joists or other structural support for the building. In larger commercial type construction, the waste pipe is typically cast in cement. In either case, access to the piping is usually limited once a building is complete with floors and walls in place.

Although waste pipe is usually a heavily constructed pipe, the corrosive effects from years of exposure to water and waste can eventually weaken the pipe. In addition, mechanical stresses such as those introduced by electric snakes or other devices utilized to dislodge a clogged drain can cause a waste pipe to fail. Often the failure includes a hole in the portion of pipe that comprises the water trap. Due to the physical location of the pipe comprising the water trap in relation to building components, partial disassembly of the building is often required to access the failed portion of pipe in order to repair the waste pipe by replacing said failed portion. Disassembly may include removal of sections of ceilings or floors, cutting floor joists in a residential building, or chiseling into the cement in a commercial building. As a result, repair of such failure is costly and time intensive. In addition, a plumber is often required to coordinate the services of other building trades in order to complete the repair.

What is needed is a method and device for effecting a repair through the water trap section of a waste pipe without having to remove the pipe or otherwise gain access to the body portion of the pipe.

SUMMARY OF THE INVENTION

Accordingly, a method and device is provided for repairing a plumbing waste pipe without having to remove a failed portion of the waste pipe. A flexible sleeve with a flange is fit inside the failed waste pipe such that the outer circumference of the sleeve is in radial contact with the inner circumference of the failed pipe and the body of the sleeve extends through the failed waste pipe beyond the point of failure. The flange can be fastened between the plumbing fixture and the failed waste pipe to securely maintain the flexible sleeve within the failed pipe. Water and waste material will enter the sleeve through the flange and pass through the interior of the sleeve beyond the point of failure in the waste pipe. The water and waste can then be discharged into the waste pipe to be carried along its normal route.

A piping insert is utilized to repair a failed plumbing waste pipe, and in particular a waste trap. The piping insert will include a radial pipe with a wall of flexible and waterproof material, such as vinyl, wherein the wall has an outside diameter sized to be in radial contact with an inside diameter of a failed waste pipe. An insert flange can be fixedly attached to one end of the radial pipe and include mounting holes in the insert flange spaced to align with mounting holes in a waste flange attached to a plumbing fixture.

The piping insert can additionally include a reinforcement rib radially molded into the wall of the radial pipe. The reinforcement rib can include a continuous coil molded or a series of radial ribs molded into the flexible material making up the wall of the radial pipe. The reinforcement rib can be include nylon, plastic, steel, aluminum or fiberglass for structural support. In addition, the piping insert can include a rounded surface conducive to forming a radial seal against the interior wall of the waste pipe.

The present invention can also include a method for repairing a failed plumbing waste pipe trap wherein the user of the present invention removes a plumbing fixture attached to a flange on the failed plumbing waste pipe and inserts a flexible pipe insert into the failed plumbing waste pipe via the flange. The flexible pipe insert is inserted beyond a point of failure on the failed waste pipe and secured to the flexible pipe. It can be secured with mounting bolts through the flange and/or an adhesive.

Before insertion, the user of the present invention can determine a length of flexible pipe insert necessary to extend from the flange on the failed plumbing waste pipe to a the point beyond the failure. The flexible insert can then be cut to a length approximately equal to the determined length.

The present invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION

A device for repair of a plumbing waste pipe is disclosed and a corresponding method for repair of a waste pipe with a failed portion, such as a hole in the wall of the waste pipe. Additional failures in the waste pipe can include a non-sealing joint in the waste pipe, a stripped plug in a Y joint or other lack of continuity in the waste pipe that may cause the waste pipe to leak.

Figure 1:
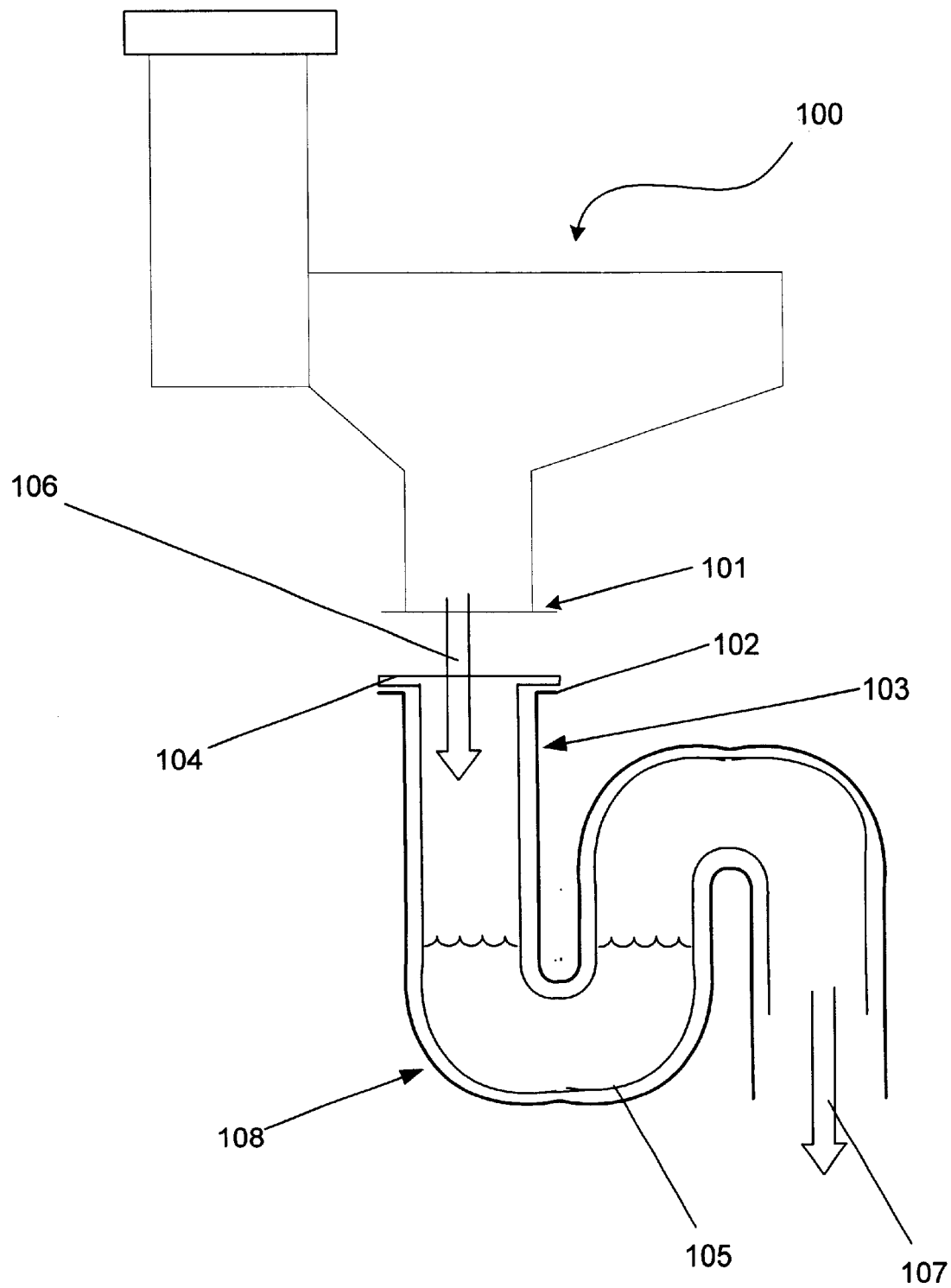
FIG. 1 is an illustration of a side perspective of a toilet fixture and waste pipe with a flexible pipe insert according to the present invention.

Referring now to FIG. 1, a plumbing fixture such as a toilet 100 will typically have a fixture waste flange 101 that connects to a waste pipe flange 102 at one extremity of a waste pipe 103. The waste pipe 103 will be shaped into a water trap portion 108 to form a barrier to sewer gases and the like from venting into the plumbing fixture 100.

A flexible pipe insert 105 with an insert flange 104 is fit inside the waste pipe 103 such that the outer circumference of the flexible pipe insert 105 is in radial contact with the inner circumference of the waste pipe 103. The radial contact will form a seal to prevent sewer gases and the like from venting into the plumbing fixture 100 or the air surrounding the waste pipe 103. The insert flange 104 can be fastened between the fixture waste flange 101 and the waste pipe flange 102 thereby securely maintaining the flexible pipe insert 105 within the waste pipe 103.

According to the present invention, water and waste will flow out of the plumbing fixture 100 through the fixture flange 101 into an insert flange 104 on the flexible pipe insert 105 at an entry point 106 of the flexible pipe insert 105. The flexible pipe insert 105 will form to the inside diameter of the waste pipe 103 such that the flexible pipe insert 105 will take on any curves or bends fashioned into the waste pipe 103. Any water or waste entering the flexible pipe insert 105 at the entry point will flow through the water trap portion 108 and out of a exit point located within the waste pipe 103. The water and waste can then be discharged into the waste pipe 103 to be carried along its normal route.

Figure 2:
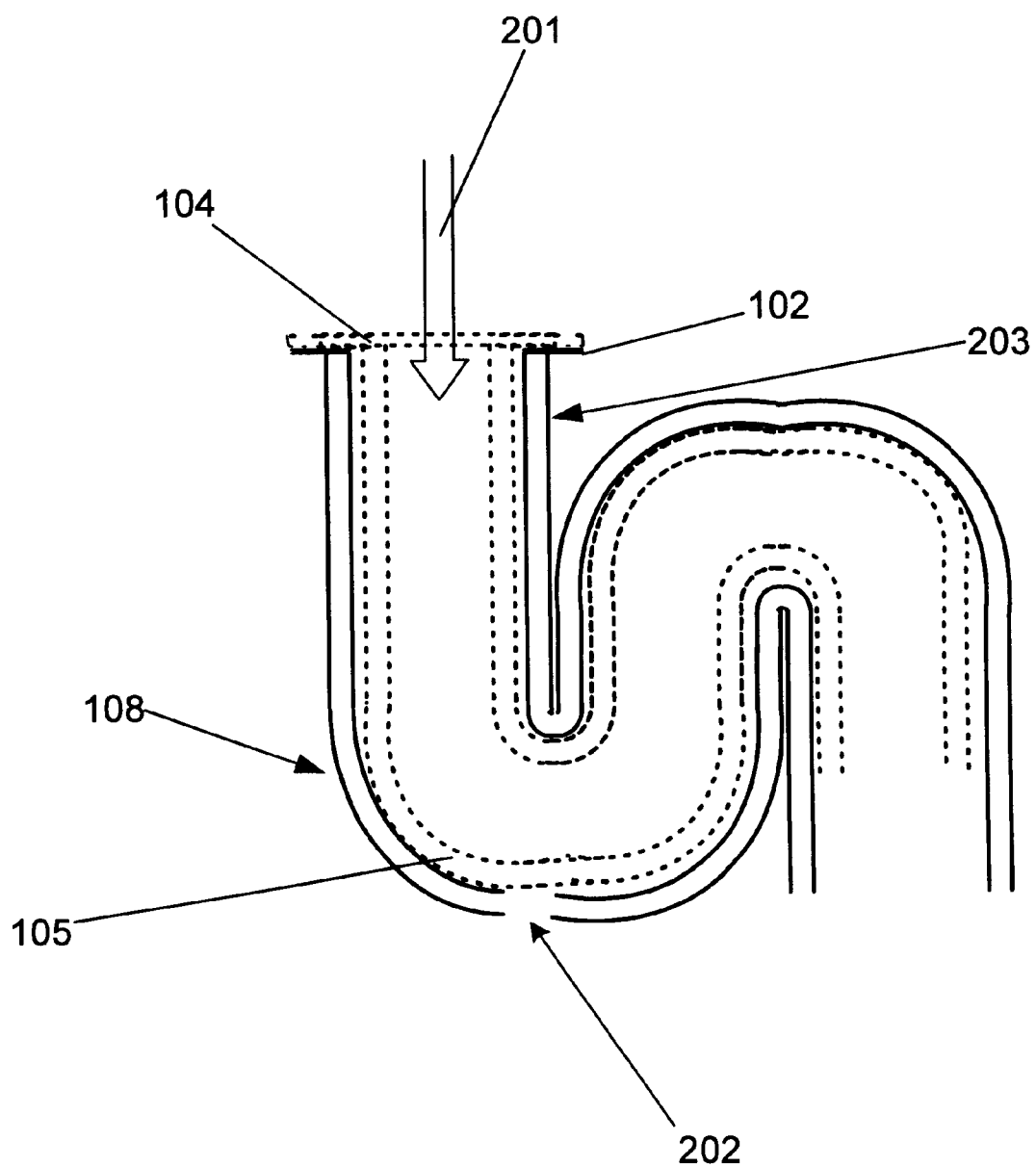
FIG. 2 is a cross sectional view of a waste pipe with a failed portion and a flexible pipe insert extending beyond the failed portion.

Referring now to FIG. 2, steps for implementing the present invention can include: determining a length of flexible insert pipe 105 which will be necessary to extend from a waste pipe flange 102 to a point beyond a failure 202 in the waste pipe 103; cutting the flexible insert pipe so that it is at least as long as the determined length; removing a plumbing fixture 100 from the top of a waste pipe flange 102; inserting a flexible pipe insert 105 in a downward direction 201 through the waste pipe flange 102 into the interior of a failed waste pipe 203 and forming the flexible pipe insert 105 to the shape of the waste pipe 103 as the flexible pipe insert 105 is inserted. In order to be effective, the flexible pipe insert 105 needs to be inserted far enough into the failed waste pipe 203 to extend beyond a point of failure in the waste pipe 202 that is in need of repair. Preferably, the flexible insert pipe 105 will be inserted far enough to extend through the water trap portion 108 of the failed waste pipe 203 such that any discharged waste will exit the flexible pipe insert 105 in a downward section of the failed waste pipe 203 and minimize the chance of any leakage between the exterior of the flexible pipe insert 105 and the interior of the failed waste pipe 203.

Mounting holes on an insert flange 104 will be aligned with mounting holes on the fixture waste flange 101 and the waste pipe flange 102. The fixture 100 is then fastened via the fixture waste flange 101 to the waste pipe flange 102 with the flexible insert flange 104 secured in-between the fixture waste flange 101 and the waste pipe flange 102 thereby also securing the flexible pipe insert 105 within the waste pipe 103.

In addition, the flexible pipe insert can be secured into the failed waste pipe 203 with cement, caulking, formable silicon or other material which can act as an adhesive to hold the flexible pipe insert 105 in place once it has been inserted. An adhesive can have the added benefit of acting as an additional sealant to prevent leakage.

Figure 3A:
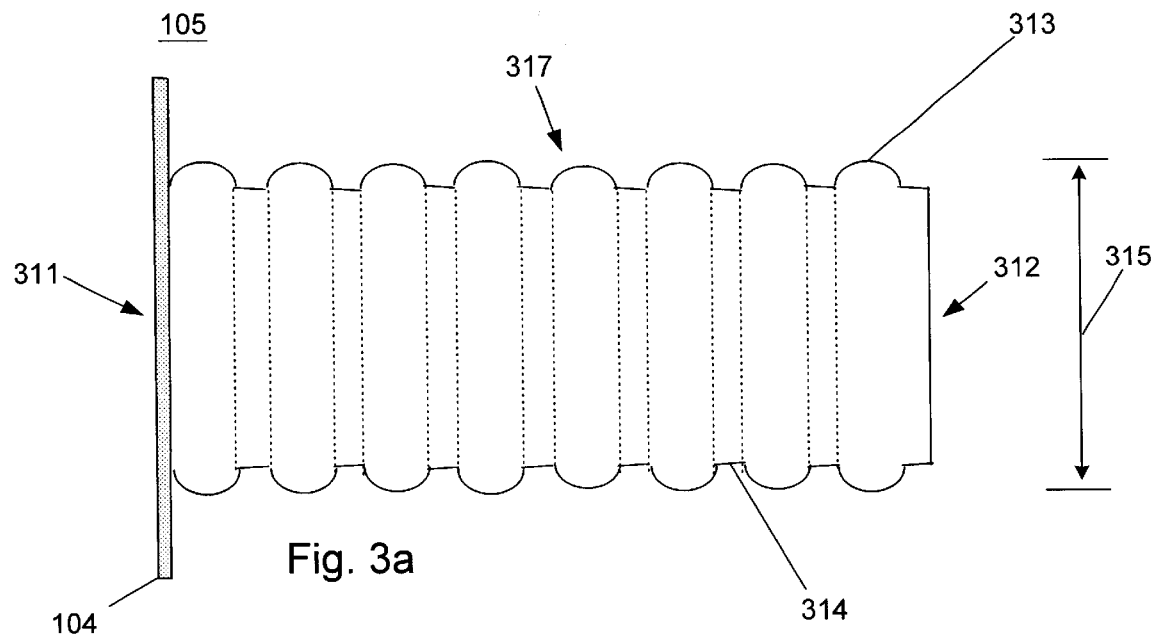
FIG. 3a is an illustration of a side perspective of a flexible pipe insert according to the present invention.

Referring now to FIG. 3a, a side perspective of an exemplary embodiment of a flexible pipe insert 105 according to the present invention is illustrated. The flexible pipe insert 105 will have an input end 311 for receiving wastewater and an output end 312 for discharging the wastewater. The input end 312 will include the insert flange 104 which will be radially attached to a pipe portion 317. The pipe portion 317 will be flexible so that it can be inserted into a waste pipe 103 and follow the contour of the interior of the waste pipe 103. The pipe portion 317 can be molded out of vinyl, rubber, or other easily flexible and resilient material. For added strength and structural stability, the pipe portion 317 can include rigid ribs 313 and flexible valleys 314 molded into the wall of the pipe portion 317. A rounded surface on the exterior of the rigid rib 313 can also serve as a seal against the interior wall of the waste pipe 103 when the flexible pipe insert 105 is installed in the waste pipe 103. The outside diameter 315 of the flexible pipe insert 105 can be manufactured in various sizes which correspond with the inside diameter of commonly used waste pipes 103.

The reinforcement ribs 313 can be molded from the same vinyl, rubber or other flexible or semi-rigid material that comprise the valley portion 314 of the flexible pipe insert 105 or the reinforcement rib 313 can include a semi-rigid ring molded into the flexible pipe insert 105. In addition, the reinforcement rib 313 can include a continuous coil that is contained within the vinyl, rubber or other flexible material that comprise the flexible pipe insert 105. The reinforcement ribs 313 can be formed from steel, nylon, plastic, fiberglass, or other resilient material.

In one embodiment, the outer surface of the reinforcement rib 313 can be shaped in a semi-circle or other shape conducive to forming a radial seal between the outer surface of the reinforcement rib 313 and the inside surface of the waste pipe 103.

Figure 3B:
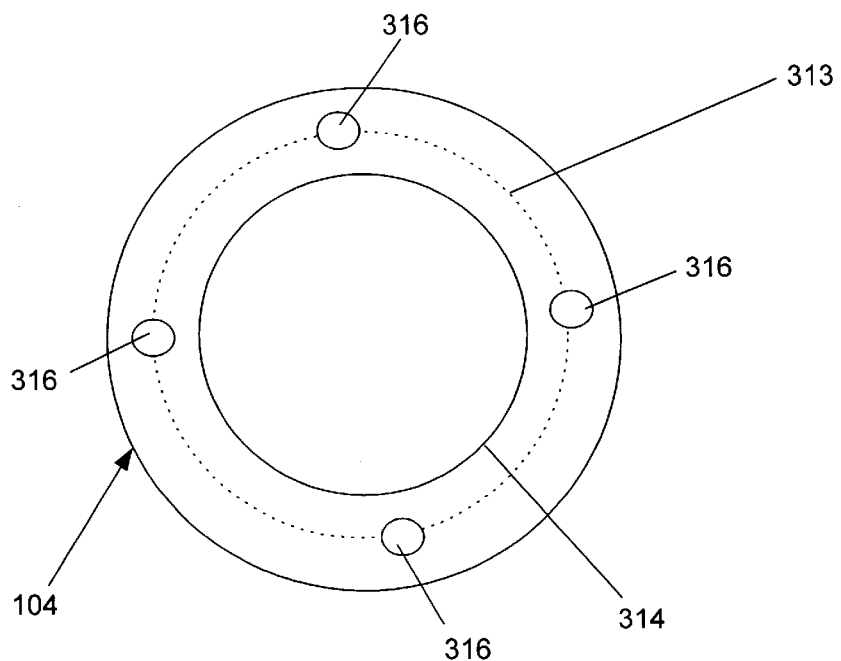
FIG. 3b is a top perspective, part phantom view of a flexible pipe insert showing the inside and outside diameters, the flange and radially molded ring contours which can act as sealing mechanisms against the inner diameter of the failed waste pipe.

FIG. 3b shows a top down perspective of the flexible pipe insert 105, including the insert flange 104 and the valley portion 314. The rigid rib 313 will have a smaller outside diameter than the insert flange 104 and as illustrated in FIG. 3b with a ghost line 313. Flexible insert mounting holes 316 can be used to secure the insert flange 104 between a plumbing fixture 101 and the waste pipe 103. Typically a threaded bolt or other fastener will be inserted through a mounting hole (not shown) in the fixture flange 101 then through a corresponding flexible insert mounting hole 313 in the insert flange and also through a mounting hole (not shown) in the waste pipe flange 102. The threaded bolt or other fastener can be secured with a nut or other appropriate securing device.

Although the description above relates to a toilet lead pipe, it will be apparent to those skilled in the art that application of this method and device is also appropriate with an S shaped plumbing trap such as those commonly utilized with a sink, bath tub, dishwasher, washing machine or other plumbing fixture.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A piping insert for repairing a failed plumbing waste pipe sized to connect to a toilet, the device comprising:

a radial pipe comprising a wall of waterproof material sufficiently flexible to conform the radial pipe to turns in a trap formed in the plumbing waste pipe when the radial pipe is inserted into an end of the plumbing wast pipe, a reinforcement rib radially molded into the wall of the radial pipe, wherein the reinforcement rib has an outside diameter sized to be in radial contact with an inside diameter of the waste pipe sized to connect to a toilet;

an insert flange formed into one end of the radial pipe for securing the radial pipe within the waste pipe when the insert flange is fastened between a plumbing fixture waste flange and a waste pipe flange connected to the waste pipe; and mounting holes in the insert flange spaced to align with mounting holes in a waste flange attached to the plumbing fixture.

2. The piping insert of claim 1, wherein the radial contact of the outer diameter of the reinforcement rib with the inside diameter of the waste pipe is sufficient to prevent venting of gas when the radial pipe is inserted into the waste pipe connected to a toilet.

3. The piping insert of claim 1, wherein the reinforcement rib comprises a continuous coil molded into the wall of the radial pipe.

4. The piping insert of claim 1 or 3 wherein the reinforcement rib comprises nylon.

5. The piping insert of claim 1 or 3 wherein the reinforcement rib comprises steel.

6. The piping insert of claim 1 or 3 wherein the reinforcement rib comprises fiberglass.

7. The piping insert of claim 1, wherein the wall of flexible and waterproof material comprises vinyl.

8. A method for repairing a failed plumbing waste pipe trap, the method comprising the steps of:

removing a plumbing fixture attached to a flange on the failed plumbing waste pipe;

inserting a flexible pipe insert into the failed plumbing waste pipe via the flange on the failed plumbing waste pipe, wherein the flexible pipe insert comprises a radial pipe comprising a wall of flexible and waterproof material and sized to connect to a toilet and a reinforcement rib radially molded into the wall of the radial pipe, wherein the reinforcement rib has an outside diameter sized to be in radial contact with an inside diameter of a waste pipe to prevent venting of gas and the flexible pipe insert has an insert flange fixedly attached to one end of the radial pipe with mounting holes in the insert flange spaced to align with mounting holes in a waste flange attached to a plumbing fixture for securing the radial pipe within the waste pipe when the insert flange is fastened between the plumbing fixture waste flange and a waste pipe flange connected to the waste pipe and wherein the flexible pipe insert is inserted beyond a point of failure on the failed plumbing waste pipe; and securing the flexible pipe insert into the plumbing waste pipe by fastening the insert flange between the plumbing fixture waste flange and the waste pipe flange.

9. The method of claim 8 additionally comprising the steps of determining a length of flexible pipe insert necessary to extend from the flange on the failed plumbing waste pipe beyond the point of failure on the failed plumbing waste pipe and cutting the flexible pipe insert to approximately the determined length.

10. The method of claim 8 wherein the flexible pipe insert is secured into the failed plumbing waste pipe with mounting bolts through the flexible pipe insert flange and the flange on the failed plumbing waste pipe.

11. The method of claim 8 wherein the flexible pipe insert is secured into the failed pluming waste pipe with an adhesive.

* * * * *